Figure 1:
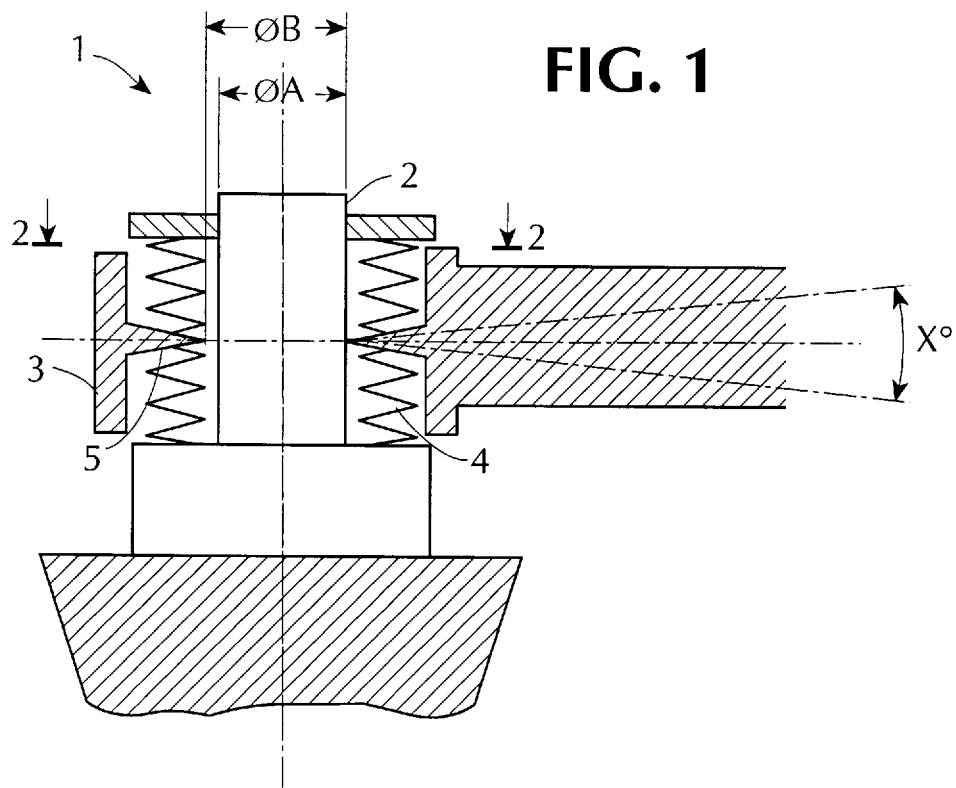

United States Patent [19]
Lumppio

[11] Patent Number: 5,829,907
[45] Date of Patent: Nov. 3, 1998

[54] KNIFE RING JOINT

[75] Inventor: Juha Lauri Lumppio, Espoo, Finland

[73] Assignee: Wenmec Systems OY, Finland

[21] Appl. No.: 637,969

[22] Filed: May 1, 1996

[30] Foreign Application Priority Data

May 9, 1995 [FI] Finland ................................. 952238

[51] Int. Cl.⁶ ................................................. F16C 27/06
[52] U.S. Cl. ......................... 403/220; 403/229; 403/226; 117/DIG. 9
[58] Field of Search .................... 403/220, 229, 403/223, 225, 226, 227, 291, 24; 177/225, DIG. 9

[56] References Cited

U.S. PATENT DOCUMENTS

| 3,158,072 | 11/1964 | Detrez | 403/225 X |
| 3,315,537 | 4/1967 | Keller | 403/225 X |
| 4,050,531 | 9/1977 | Ashbrook | 177/DIG. 9 |
| 4,062,418 | 12/1977 | Miller | 177/DIG. 9 |
| 5,209,138 | 5/1993 | Shu | 403/229 X |
| 5,392,662 | 2/1995 | Jadrich et al. | 403/220 X |

FOREIGN PATENT DOCUMENTS

| 709295 | 5/1931 | France | 403/220 |
| 2657961 | 8/1991 | France | 177/225 |
| 2800647 | 7/1979 | Germany | 177/DIG. 9 |

*Primary Examiner*—Harry C. Kim
*Attorney, Agent, or Firm*—Brooks Haidt Haffner & Delahunty

[57] ABSTRACT

The present invention relates to a knife ring joint, the purpose whereof is to reduce mechanical friction and to increase weighing accuracy in a scale which is used in the casting of molten material. The knife ring is designed to be pressed in a ring-like fashion against a cylinder surface serving as the countersurface, and any motion in the direction of the lengthwise axis of the cylinder surface is prevented by of a flexible element.

7 Claims, 2 Drawing Sheets

KNIFE RING JOINT

BACKGROUND OF THE INVENTION

The present invention relates to a knife ring joint, the purpose whereof is to reduce mechanical friction and increase weighing accuracy in a scale which is used in the casting of molten material. The knife ring is designed to be pressed as a ring against a cylinder surface serving as the countersurface, and any motion of the cylinder surface in the direction of the lengthwise axis is prevented by means of a flexible element.

The casting of molten material, such as metal, and its weighing in the same connection is essential for instance when casting metal anodes, because the next process step after anode casting is electrolysis, where one condition for achieving a high efficiency is a uniform quality of anodes, with respect to both shape and weight. Uniform quality requires that when the weight error is no more than ±1%, it has no practical significance in the electrolysis.

Anode casting takes place by inclining the casting ladle by means of a hydraulic cylinder which tilts the cradle on top of which the ladle is adjusted. The cradle and the other end of the hydraulic cylinder are geared to a bridge. The cradle, the hydraulic cylinder and the bridge float supported by a complex leverage which transforms the vertical forces directed to the ladle to a force measurable by one or several traction sensors.

As was maintained above, the horizontal forces directed to the floating part of the scale are canceled by means of leaf springs. They can only receive traction. When all twists and shifts should be prevented, there are needed at least six springs.

Only the leaf springs that tolerate traction can be replaced by constrainers provided with articulations at each end. A constrainer can receive both traction and compression, and it replaces two leaf springs. The use of three constrainers in the scale instead of leaf springs reduces the need to adjust the clearance of the leaf springs. The bridge floating on one or several sensors is tightly attached to the housing, and the sideways motion which is harmful for the sensors is minimized.

The friction in the joints is not a hindrance in case it maintains its magnitude and does not fluctuate at random, and possible changes in the load take place in the same direction without exception. However, the expected movements of the ladle and the molten metal contained therein cause changes in the loads, particularly in the initial and final weighing, where the measuring results should be most accurate. The electronics program of the scale can take into account any linearity errors of the scale, but random errors cannot be observed.

One solution to the changing friction could be a ball-and-socket joint, where the bearing is realized with balls in between the surfaces. Such a joint could be better than an ordinary ball-and-socket joint, because normal forces affect rolling friction remarkably less than sliding friction. However, in a static case such ball-and-socket joints only function in one direction, and therefore they should be adjusted in the scale with the rotating axis on the horizontal level.

This type of ball-and-socket joint should be well protected against corrosion, and it requires regular maintenance.

From the point of view of the operation of the scale it is essential that the forces present in the constrainers do not affect the resistance of the joints. In an ideal case, the resistance is always the same, so that it appears as a linearity error only and can be easily corrected.

Another solution where the resistance does not change too much along with the changes in the reaction forces could be a rubber sleeve used in the supporting arms of cars. The properties of rubber can, however, change, and if the elastic clearance in the joints is too wide, the scale can start wobbling. Wobbling and changes in the scale position affect the measuring result, wherefore large elastic clearances in joints are not allowed.

Elastic clearances can be eliminated by applying the knife-and-pan principle. A knife-and-pan bearing is a commonly used bearing application in scales. This type of bearing contains a sharp-ground knife made of an extremely hard material, the blade whereof is pressed in a v-groove made of the same material. Such a bearing, where the mass swings on top of the blade edge, does not cause any resistance, if the blade edge is in order and there is no scrap in the groove.

THE INVENTION

According to the present invention, there is formed a knife ring joint, where the knife is made in a ring form, and the countersurface is a cylinder surface, so that it operates in the same fashion in every direction. Some flexible material keeps the knife ring in place, and consequently there is no need for a groove in the countersurface. The joint of the present invention does not require maintenance, and its functional parts are protected from dirt and dust. The essential novel features of the invention are apparent from the appended claims.

BREIF DESCRIPTION OF THE DRAWINGS

Figure 2:
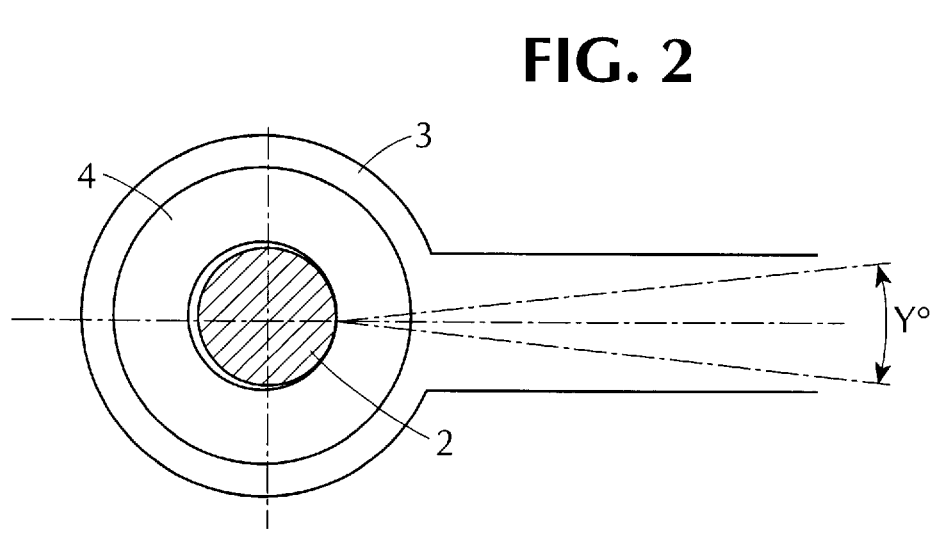
Figure 3:
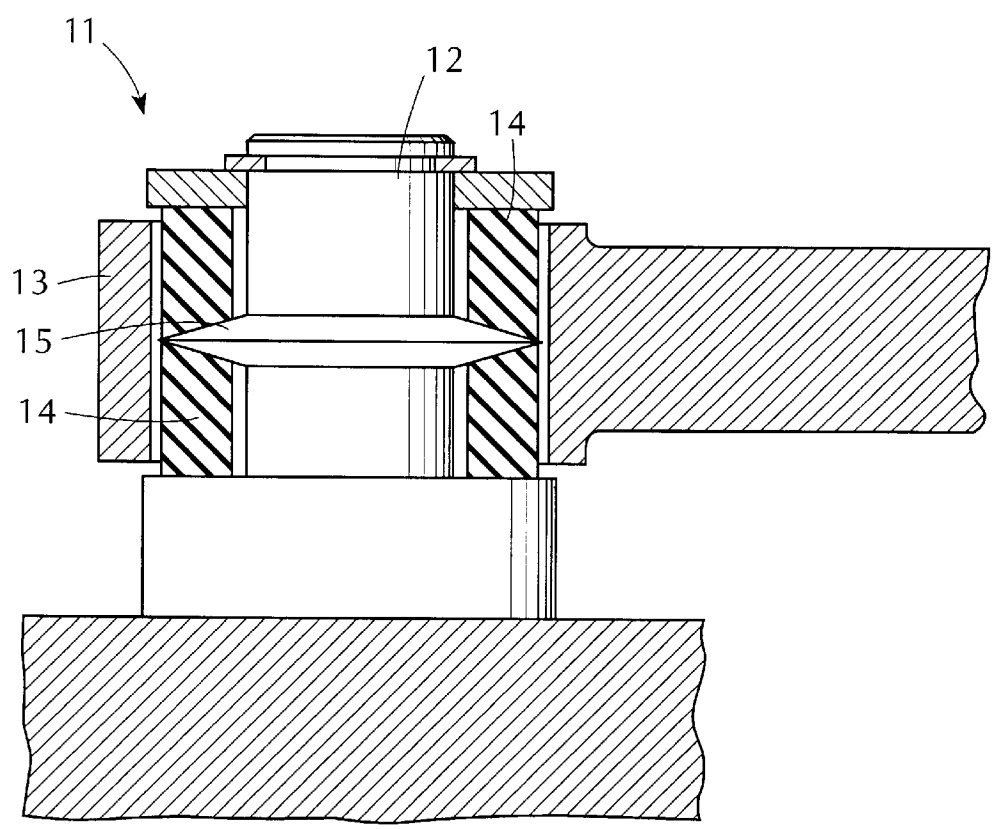

The invention is described in more detail with reference to the accompanying drawings, where FIG. 1 illustrates the knife ring joint of the invention as seen from the side, FIG. 2 shows a section A—A of FIG. 1 as seen from the top and, FIG. 3 shows a partial sectional view of an embodiment of the invention seen from the slide.

The operation of the knife ring joint 1 is based on the small clearance between the cylindrical sleeve 2 with diameter A, serving as the countersurface, and the knife ring 3, with a hole diameter B. The name already reveals that the knife is ring-like in shape. The clearance enables sufficient angle changes X and Y in the horizontal and vertical directions. A flexible material 4, which is arranged on both sides of the knife ring, keeps the knife ring in place if it tends to shift away from position, and thus prevents all other motions except for those caused by angle changes, for instance motions taking place in the lengthwise axis of the cylinder surface. The flexible material can advantageously be for example rubber, or springs made of steel.

FIG. 2 illustrates a situation where compression strain is directed to the joint.

When traction strain is directed to the joint, the clearance is located on the opposite side of the sleeve.

We have above described a situation where the knife ring joint is placed outside the sleeve serving as the countersurface. Another feasible solution is to adjust the knife ring joint inside the sleeve, in which case the inner surface of the sleeve serves as the countersurface.

The disposition of the knife joint inside the inner surface of the sleeve is illustrated in FIG. 3. Knife ring joint 11 according to the invention has knife ring 15 located on member 12 inside cylindrical sleeve 13. Flexible material 14 is arranged on both sides of knife ring 15 to keep the knife ring in place and thus prevents all other motions except for those caused by angle changes. Flexible material 14 can, for example, be rubber, as mentioned above.

The disposition of the knife joint inside the inner surface of the sleeve is illustrated in FIG. 3. Knife ring joint 11 according to the invention has knife ring 15 located on member 12 inside cylindrical sleeve 13. Flexible material 14 is arranged on both sides of knife ring 15 to keep the knife ring in place and thus prevents all other motions except for those caused by angle changes. Flexible material 14 can, for example, be rubber, as mentioned above.

The knife ring joint allows small angle changes required by scale mechanics, so that the force generated in the knife ring and resisting angle change is not essentially dependent on the compression or traction forces directed to the joint. In practice the knife ring joint is realized so that its outer dimensions correspond to a standard ball-and-socket joint. The edge 5 of the knife blade is wide and rounded in order to endure loads without breaking. The clearances of the joint allow an angle change of 2–15 degrees, advantageously about five degrees. When the angle change is about five degrees and the sleeve diameter is 30 mm, the clearances are about 0.03 mm, which means that in practice the clearance is not even visible. The resistance caused by the joints according to the invention can be reduced from the weighing result, and thus the obtained results are more accurate than when using a joint - such as the ball-and-socket joint generally used in the constrainers of scales - where the resistance is dependent on the compression or traction forces present in the joints, said forces causing changes in the friction momentum. Experiments show that in hysteresis properties the new knife ring joint is 4–10 times better than the ball-and-socket joint.

The joint of the present invention can be used in all scale applications where one or several constrainers are used, either in transmitting force or in binding the element to be weighed in place. Apart from weighing molten materials, the invention can naturally be applied to other purposes as well.

What is claimed is:

1. A joint used in a scale for accurately weighing loads in the casting of molten material in connection with constrainers, characterized in that the joint comprises a knife ring having an annular knife edge; a cylindrical surface serving as a countersurface on which the edge can bear, there being a clearance between the edge and the cylindrical surface; and on each side of the knife ring a flexible element to prevent any motion of the knife ring in the direction of the axis of the cylindrical surface.

2. A joint according to claim 1, characterized in that the edge of the knife ring is wide and rounded.

3. A joint claim according to claim 1, characterized in that the clearance of the joint allowed an angle change of the angle defined by the plane perpendicular to the axis of the ring and the axis of the cylindrical surface of from 2–15 degrees.

4. A joint according to claim 1, characterized in that the knife ring is located outside the cylindrical surface.

5. A joint according to claim 1, characterized in that the knife ring is located inside the cylindrical surface.

6. A joint according to claim 1, characterized in that the flexible element is made of rubber.

7. A joint according to claim 1, characterized in that the flexible element is formed of steel springs.

* * * * *